(12) United States Patent
Sasaki (10) Patent No.: US 10,139,584 B2
(45) Date of Patent: Nov. 27, 2018

(54) LENS APPARATUS AND OPTICAL APPARATUS

(71) Applicant: CANON KABUSHIKI KAISHA, Tokyo (JP)

(72) Inventor: Kunihiko Sasaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 170 days.

(21) Appl. No.: 14/627,454

(22) Filed: Feb. 20, 2015

(65) Prior Publication Data

US 2015/0241759 A1 Aug. 27, 2015

(30) Foreign Application Priority Data

Feb. 21, 2014 (JP) ................................. 2014-031209

(51) Int. Cl.
*G02B 15/14* (2006.01)
*G02B 7/02* (2006.01)
(Continued)

(52) U.S. Cl.
CPC ............. *G02B 7/023* (2013.01); *G02B 7/021* (2013.01); *G02B 7/08* (2013.01); *G03B 5/02* (2013.01); *G03B 17/14* (2013.01)

(58) Field of Classification Search
CPC ...... H04N 5/23296; G02B 7/02; G02B 7/102; G02B 7/10; G02B 15/173; G02B 25/002;
(Continued)

(56) References Cited

U.S. PATENT DOCUMENTS

| | | | | |
|---|---|---|---|---|
| 2007/0195430 A1* | 8/2007 | Koyama | ................ | G03B 5/00 359/703 |
| 2009/0059390 A1* | 3/2009 | Koyama | ................ | G02B 7/102 359/701 |
| 2013/0335623 A1* | 12/2013 | Furuyama | .............. | G02B 7/023 348/373 |

FOREIGN PATENT DOCUMENTS

| | | |
|---|---|---|
| JP | 2002196205 A | 7/2002 |
| JP | 2006058582 A | 3/2006 |

(Continued)

OTHER PUBLICATIONS

Office Action issued in Japanese Appln. No. 2014031209 dated Nov. 21, 2017. English Translation provided.

*Primary Examiner* — Dawayne A Pinkney
(74) *Attorney, Agent, or Firm* — Rossi, Kimms & McDowell LLP (57) ABSTRACT

The lens apparatus includes a lens holder holding a first lens, and a base member supporting the lens holder. The lens holder and the base member are connected to each other at connecting portions each including first and second contacting portions provided in the lens holder and first and second receiving portions provided in the base member. The first receiving portion contacts the first contacting portion in a circumferential direction, and the second receiving portion contacts the second contacting portion in an optical axis direction. The first contacting portion is constituted by a rotatable eccentric member including an eccentric portion contacting the first receiving portion. The eccentric member rotates to change a position of the lens holder in an orthogonal-to-optical axis plane. The first and second contacting portions and the first and second receiving portions are respectively circumferentially adjacent.

6 Claims, 4 Drawing Sheets

(51) Int. Cl.
*G02B 7/08* (2006.01)
*G03B 5/02* (2006.01)
*G03B 17/14* (2006.01)

(58) Field of Classification Search
CPC ........ G02B 7/021; G02B 23/125; G02B 7/14;
G02B 7/023; G02B 5/06; G02B 7/04;
G02B 7/08; G02B 7/026; G03B 17/14
USPC ................ 359/703, 694, 676, 704, 808, 811,
359/813–815, 819, 821–830; 396/76, 79;
348/240.99–240.3
See application file for complete search history.

(56) References Cited

FOREIGN PATENT DOCUMENTS

| | | | |
|---|---|---|---|
| JP | 2006078827 | A | 3/2006 |
| JP | 2007011052 | A | 1/2007 |
| JP | 2012123154 | A | 6/2012 |
| JP | 2013037306 | A | 2/2013 |
| JP | 2013238792 | A | 11/2013 |

\* cited by examiner

DIRECTION ORTHOGONAL TO
OPTICAL AXIS

FIG. 5

LENS APPARATUS AND OPTICAL APPARATUS

BACKGROUND OF THE INVENTION

Field of the Invention

The present invention relates to a lens apparatus used for optical apparatuses such as interchangeable lenses and image capturing apparatuses.

Description of the Related Art

In such a lens apparatus (lens barrel), multiple lens holders respectively holding lenses are installed while a relative shift of their optical axes (hereinafter referred to as "an optical axis shift") are adjusted or corrected.

Japanese Patent Laid-Open No. 2006-058582 discloses a lens barrel in which a first lens holder is provided with a reinforcing plate attached thereto, the reinforcing plate is formed with paired walls extending in an optical axis direction and an eccentric pin is disposed between the paired walls and a second lens holder. This lens barrel allows, by rotating the eccentric pin, moving the second lens holder with respect to the first lens holder in a plane orthogonal to the optical axis direction and thereby correcting an optical axis shift of the first and second lens holders.

Japanese Patent Laid-Open No. 2007-011052 discloses a lens barrel in which an eccentric adjusting pin (eccentric cylindrical member) and a washer are arranged between first and second lens holders and are tightly sandwiched therebetween by screwing of fixing screws penetrating through the eccentric adjusting pin and the washer from a front side of the first lens holder in an optical axis direction. This lens barrel allows, by rotating the eccentric adjusting pin, moving the second lens holder with respect to the first lens holder in a plane orthogonal to the optical axis direction and thereby correcting an optical axis shift of the first and second lens holders. However, the lens barrel disclosed in Japanese Patent Laid-Open No. 2006-058582 requires the reinforcing plate in addition to the second lens holder, which results in an increase in total number of component parts. Moreover, this lens barrel requires fastening members, such as screws, disposed at other positions (phases) than that of the eccentric pin in a circumferential direction as viewed from the optical axis direction and used to fix the reinforcing plate to the first lens holder from the optical axis direction. This requirement results not only in a further increase in total number of the component parts, but also in, due to a large space occupied by the reinforcing plate, limitation in design flexibility of the lens barrel. On the other hand, the lens barrel disclosed in Japanese Patent Laid-Open No. 2007-011052 requires a large space in the optical axis direction because the eccentric adjusting pin, the washer and a head portion of the fixing screw are arranged such that they are stacked in the optical axis direction.

As described above, the lens barrel disclosed in Japanese Patent Laid-Open No. 2006-058582 requires providing, at other phases than that of the eccentric pin as viewed from the optical axis direction, the screws irrelevant to the correction of the optical axis shift. Moreover, the lens barrels disclosed in Japanese Patent Laid-Open Nos. 2006-058582 and 2007-011052 both require the screws extending in the optical axis direction. It is impossible to significantly shorten lengths of the screws from a fastening strength point of view, which restricts improvement of space efficiency.

SUMMARY OF THE INVENTION

The present invention provides a lens apparatus which enables, by improving arrangement efficiency of an adjusting mechanism for correcting the optical axis shift, reducing its size and having a higher design flexibility. The present invention further provides an optical apparatus including the lens apparatus.

The present invention provides as an aspect thereof a lens apparatus including a lens holder configured to hold a first lens, and a base member configured to support the lens holder. The lens holder and the base member are connected to each other at connecting portions provided at multiple locations in a circumferential direction about an optical axis of the lens apparatus. Each of the connecting portions includes a first contacting portion and a second contacting portion both provided in the lens holder, and a first receiving portion and a second receiving portion both provided in the base member. The first receiving portion contacts the first contacting portion from both sides in the circumferential direction, and the second receiving portion contacts the second contacting portion from both sides in an optical axis direction in which the optical axis extends. In at least one of the connecting portions, the first contacting portion is constituted by an eccentric member being rotatable with respect to the lens holder and including an eccentric portion eccentric with respect to a rotation center of the eccentric member. The eccentric portion contacts the first receiving portion. In each of the connecting portions, the second contacting portion contacts the second receiving portion so as to position the lens holder with respect to the base member in the optical axis direction and to prevent the lens holder from tilting with respect to the base member, and rotation of the eccentric member changes a position of the lens holder with respect to the base member in a plane orthogonal to the optical axis. In the lens holder the first and second contacting portions are adjacent to each other in the circumferential direction, and in the base member the first and second receiving portions are adjacent to each other in the circumferential direction. The second contacting portion is configured to make contact with the second receiving portion by, in a state where the second contacting portion is inserted inside the first receiving portion, rotation of the lens holder with respect to the base member in the circumferential direction.

The present invention provides as another aspect thereof an optical apparatus including the above lens apparatus, and a body configured to house or hold the lens apparatus.

Further features of the present invention will become apparent from the following description of exemplary embodiments with reference to the attached drawings.

DESCRIPTION OF THE EMBODIMENTS

An exemplary embodiment of the present invention will be described below with reference to the attached drawings.

Figure 1:
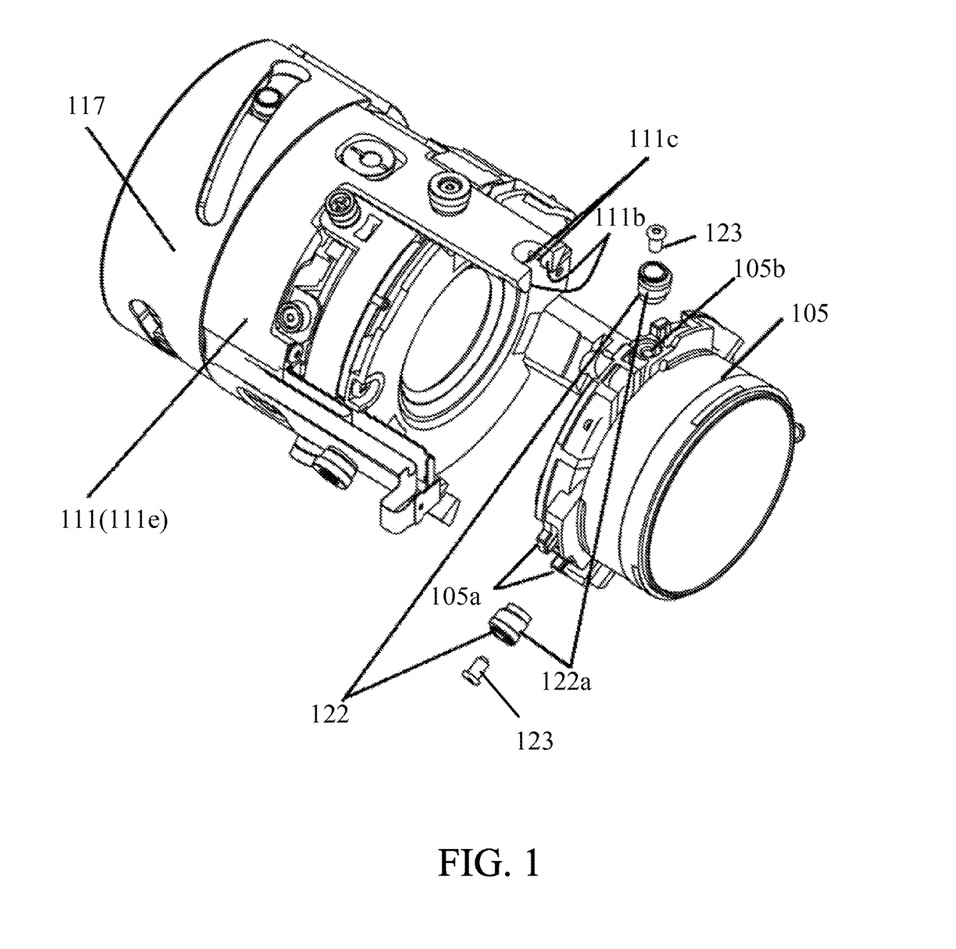
FIG. 1 is an exploded perspective view illustrating a lens holding structure of a lens barrel that is an embodiment of the present invention.
Figure 2:
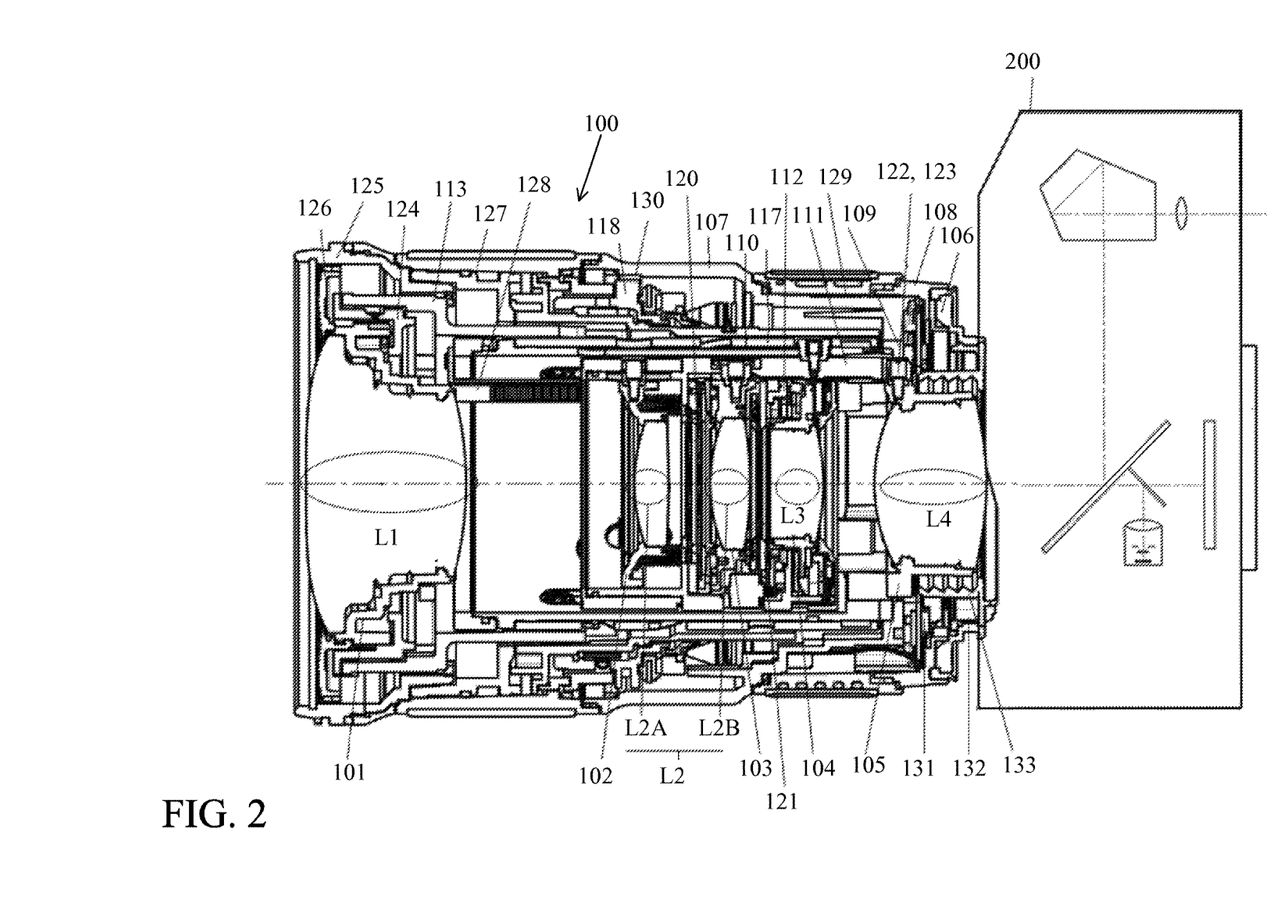
FIG. 2 is a sectional view illustrating an interchangeable lens including the lens barrel of the embodiment and illustrating a single-lens reflex camera.
Figure 3:
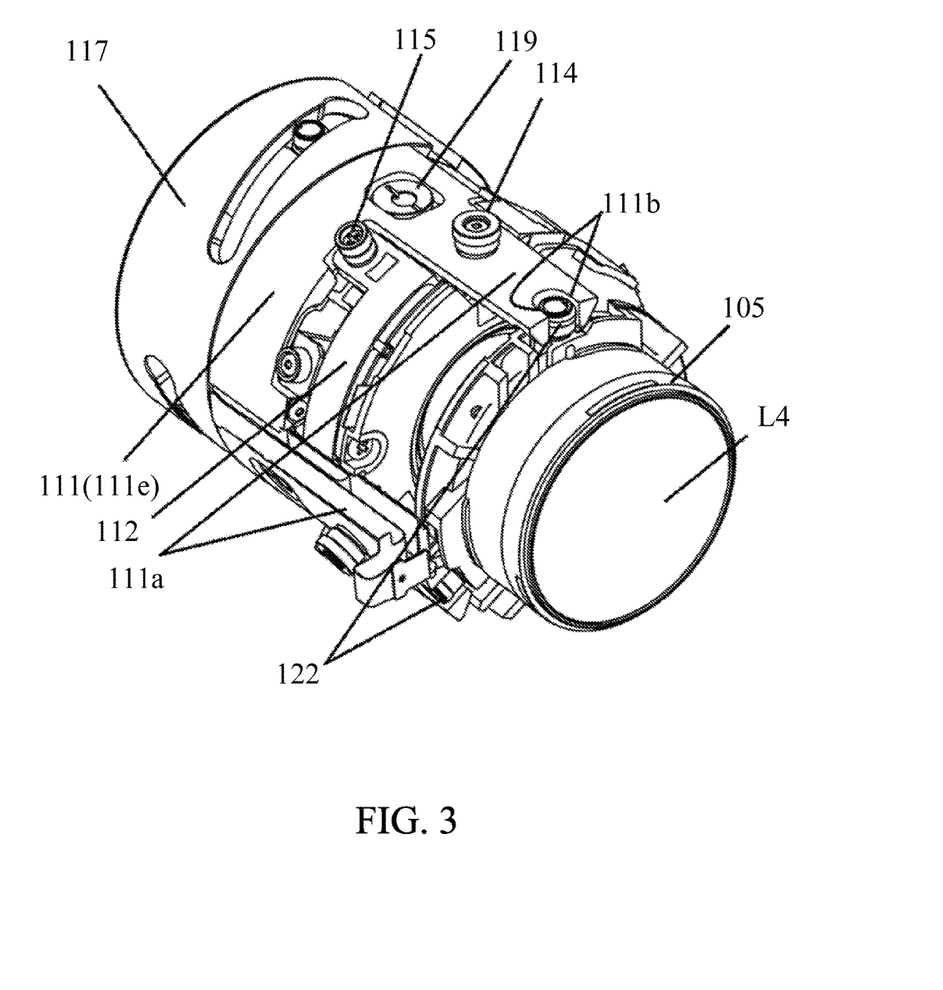
FIG. 3 is a perspective view illustrating the lens holding structure illustrated in FIG. 1.

FIG. 2 illustrates a section of an interchangeable lens (optical apparatus) 100 that is an embodiment of the present invention and a single reflex camera (hereinafter referred to as "a camera body") 200 to which the interchangeable lens 100 is detachably attached, the section being along an optical axis of the interchangeable lens 100. FIG. 1 and FIG. 3 are exploded and perspective views respectively illustrating a lens holding structure that is part of a lens barrel (lens apparatus) constituting the interchangeable lens 100.

The interchangeable lens 100 includes an image capturing optical system including first, second, third and fourth lens units L1, L2, L3 and L4. The second lens unit L2 is divided into two subunits (object- and image-side subunits) L2A and L2B respectively disposed on an object side and an image side.

During zooming, all of the lens units L1 to L4 are moved in a direction in which the optical axis extends (hereinafter referred to as "an optical axis direction"); the second and fourth lens units L2 and L4 are moved integrally with each other. The third lens unit L3 is moved in the optical axis direction during the zooming and is moved in a direction orthogonal to the optical axis as an image stabilizing lens unit to correct image blur caused by camera shaking due to hand jiggling and the like. On the other hand, during focusing, the object-side subunit L2A of the second lens unit L2 is moved in the optical axis direction.

The first lens unit L1 is held by a first lens holding frame 101. The object-side subunit L2A of the second lens unit L2 is held by an object-side second lens holding frame 102, and the image-side subunit L2B of the second lens unit L2 is held by an image-side second lens holding frame 103. The third lens unit L3 is held by a third lens holding frame 104. The fourth lens unit (first lens) L4 is held by a fourth lens holding frame (lens holder) 105.

Reference numeral 106 denotes a mount provided to the interchangeable lens 100. The mount 106 is screw-fixed to a fixed barrel 107 and includes a bayonet portion that allows the interchangeable lens 100 to be detachably mounted to the camera body 200. The fixed barrel 107 constitutes an interchangeable lens body that houses or holds the lens barrel. Reference numeral 108 denotes an exterior ring fixed between the mount 106 and the fixed barrel 107.

The fixed barrel 107 is provided with a scale window, a name plate and a switch panel (each being not illustrated) attached thereto. Switching of switches provided in the switch panel enables, for example, switching of a focus mode between autofocus and manual focus and turning on and off of an image stabilization function.

Reference numeral 109 denotes a guide barrel fixed to the fixed barrel 107. The guide barrel 109 supports at its outer circumference a cam barrel 110 rotatably about the optical axis.

Reference numeral 111 denotes a lens unit base frame (base member) that supports the object-side second, image-side second, third and fourth lens holding frames 102, 103, 104 and 105. The lens unit base frame 111 is provided with a roller 114 screw-fixed thereto, an image stabilizing unit 112 is provided with a roller 115 screw-fixed thereto, and linearly movable barrel 113 is provided with a roller (not illustrated, but denoted by reference numeral 116 for explanation) screw-fixed thereto. The rollers 114 to 116 are engaged with guide groove portions formed in the guide barrel 109 so as to extend in the optical axis direction and with cam groove portions formed in the cam barrel 110.

Rotation of the cam barrel 110 about the optical axis moves, through engaging actions of the rollers 114 to 116 guided by the guide groove portions in the optical axis direction and the cam groove portions, the lens unit base frame 111, the image stabilizing unit 112 and the linearly movable barrel 113 in the optical axis direction. Thereby, the zooming is performed.

Around an outer circumference of the lens unit base frame 111, a focus cam barrel 117 is disposed rotatably about the optical axis with respect to the lens unit base frame 111. The focus cam barrel 117 is rotationally driven by a driving force from a vibration type motor. The vibration type motor is included in a focus lens driving unit 118 and will be described later.

The object-side second lens holding frame 102 is moved, by a guide groove portion formed in the lens unit base frame 111 so as to extend in the optical axis direction and a cam groove portion formed in the focus cam barrel 117, with respect to the lens unit base frame 111 in the optical axis direction. Thereby, the focusing is performed.

The image side second lens holding frame 103 is provided with three eccentric rollers 119 attached thereto through a second-unit position adjusting mechanism which enables correction of an optical axis shift of the image-side second lens holding frame 103 with respect to the lens unit base frame 111. The lens unit base frame 111 is provided with an electromagnetic aperture stop unit 120 fixed thereto.

Furthermore, the lens unit base frame 111 is provided with the fourth lens holding frame 105 fixed thereto through a fourth-unit position adjusting mechanism which enables position adjustment of the fourth lens holding frame 105 in the direction orthogonal to the optical axis (that is, enables correction of an optical axis shift of the fourth lens holding frame 105). The movement of the lens unit base frame 111 in the optical axis direction during the zooming moves the second lens unit L2 (L2A and L2B) and the fourth lens unit L4 integrally with each other in the optical axis direction as mentioned above.

The lens unit base frame 111 includes a lens holding portion 111e that holds the second lens unit (second lens) L2 through the object-side and image side second lens holding frames 102 and 103 as mentioned above. The lens unit base frame 111 further includes extending portions 111a extending from three circumferential locations (multiple locations) of the lens holding portion 111e toward a rear side (image side) in the optical axis direction. The extending portions 111a are arranged at approximately equal intervals in a direction about the optical axis (hereinafter referred to as "a circumferential direction"). The three extending portions 111a each extend to the fourth lens holding frame 105 through a minimum space while avoiding interference with component parts located inside the image stabilizing unit 112 such as a driver and a detector (each being not illustrated) and thereby form connecting portions that connects the lens unit base frame 111 with the fourth lens holding frame 105. In the connecting portion, the above-described fourth-unit position adjusting mechanism is formed.

Figure 4:
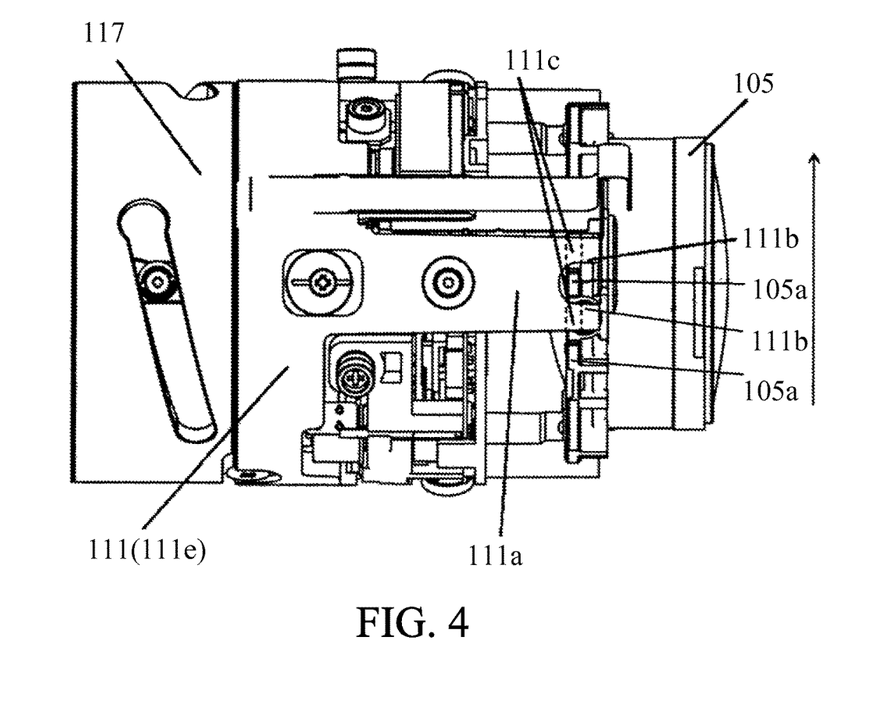
FIG. 4 is an external view illustrating the lens holding structure illustrated in FIG. 1 that is in process of assembling.

FIG. 4 illustrates the lens holding structure in process of assembling. At a rear end of each of the extending portions 111a, paired wall portions 111b are provided which are formed so as to extend in the optical axis direction and face each other in the circumferential direction. The paired wall portions 111b correspond to a first receiving portion. Between the paired wall portions 111b, one of paired protrusions (second contacting portions) 105a formed at each of three circumferential locations of an outer circumferential portion of the fourth lens holding frame 105 is inserted from the rear side. In an inner circumferential surface of the rear end of each of the extending portions 111a, a groove portion (second receiving portion) 111c is formed which extends in the circumferential direction so as to traverse the extending portion 111 and which includes inner surfaces facing each other in the optical axis direction. In a state where the protrusion 105a inserted between (inside) the paired wall portions 111b coincides in position with the groove portion 111c in the optical axis direction, rotating the fourth lens holding frame 105 in a direction indicated by an arrow shown in FIG. 4 (i.e., in a clockwise direction as viewed from the camera body 200) causes the protrusions 105a provided at the three circumferential locations to engage with the groove portions 111c of the three extending portions 111a. That is, the inner surfaces of each of the groove portions 111c facing each other in the optical axis direction contact the inserted protrusion 105a from both sides in the optical axis direction. This engagement fixes a position of the fourth lens holding frame 105 with respect to the lens unit base frame 111 in the optical axis direction. Moreover, this engagement prevents the fourth lens holding frame 105 from tilting with respect to the lens unit base frame 111, that is, prevents the fourth lens unit L4 from tilting with respect to the optical axis.

This embodiment sets a thickness of the protrusion 105a formed in the fourth lens holding frame 105 in the optical axis direction to be slightly thicker (approximately +0.001 to 0.05 mm) than a width of the groove portion 111c of the lens unit base frame 111 in the optical axis direction. This setting causes the protrusion 105a to engage with the groove portion 111c in a slightly press-fitted state, which realizes a configuration that is less prone to cause a backlash in relation to the position in the optical axis direction and tilting of the fourth lens holding frame 105.

In the state where the protrusions 105a are engaged with the groove portions 111c, non-eccentric portions 122c of three eccentric rollers (first contacting portions) 122 are respectively attached rotatably by screws 123 to roller seats 105b located at three circumferential locations each between the paired wall portions 111b of each of the three extending portions 111a of the fourth lens-holding frame 105. Thereby, as illustrated in FIG. 3, an eccentric portion 122a of each of the eccentric rollers 122 is fitted between the paired wall portions 111b of each of the three extending portions 111a. That is, the paired wall portions 111b contact the eccentric portion 122a of the eccentric roller 122 from both sides in the optical axis direction. The eccentric roller 122 is rotatable about a center axis of the non-eccentric portion 122c with respect to the fourth lens holding frame 105, and the eccentric portion 122a is eccentrically rotated with rotation of the eccentric roller 122.

The contact of the eccentric portions 122a of the three eccentric rollers 122 with the paired wall portions 111b of the three extending portions 111a fixes a position (hereinafter referred to as "an eccentric position") of the fourth lens holding frame 105 with respect to the lens unit base frame 111 in the plane orthogonal to the optical axis. As a result, the eccentric position of the fourth lens holding frame 105 is uniquely fixed to a central coordinate formed by an intersection of the center axes of the non-eccentric portions 122c of the three eccentric rollers 122 arranged at the three circumferential locations at approximately equal intervals. Rotating the eccentric rollers 122 moves the above-described intersection with respect to the lens unit base frame 111, which makes it possible to change (correct) the eccentric position of the fourth lens holding frame 105.

Although, this embodiment provides the eccentric portion 122a to all of the three eccentric rollers 122, any one or two of three rollers may have no eccentric portion.

The above-described configuration provides the wall portions 111b to fix the eccentric position of the fourth lens holding frame 105 as viewed from the optical axis direction and the groove portions 111c to fix the position of the fourth lens holding frame 105 in the optical axis direction and to prevent the tilt thereof at same phases in the circumferential direction. This configuration enables efficiently arranging the wall portions 111b and the groove portions 111c.

Furthermore, this embodiment arranges the groove portions 111c and the eccentric rollers 122 (and the wall portions 111b) at same positions in the optical axis direction, which requires no additional length in the optical axis direction to allow insertion of a member such as a screw having a certain length. This arrangement enables realizing a structure that fixes the eccentric position of and the position in the optical axis direction of the fourth lens holding frame 105 with good space efficiency and that prevents the tilt of the fourth lens holding frame 105.

Moreover, since the groove portion 111c is formed so as to extend on circumferential both sides of the eccentric roller 122, a torque generated due to the rotation of the eccentric roller 122 for the correction of the eccentric position (optical axis shift) can be received by the groove portion 111c immediately adjacent on the circumferential both sides to the eccentric roller 122. This configuration minimizes a deformation generated around the eccentric roller 122. Furthermore, this embodiment forms directly at the rear end of the extending portion 111a of the lens unit base frame 111 a spatial portion (between the paired wall portions 111b) to house the eccentric roller 122. This spatial portion enables shortening a length of the lens holding structure in the optical axis direction, as compared to a case where another member is attached to the rear end of the extending portion 111a.

Moreover, although this embodiment uses the eccentric rollers 122 in order to ensure the fixing of the eccentric member by the screw 123 for correcting the eccentric position, an eccentric pin may alternatively be used without using the screw 123.

The image stabilizing unit 112 holds the third lens unit L3 such that the third lens unit L3 is movable (shiftable) in the direction orthogonal to the optical axis and shifts the third lens unit L3 through the driver constituted by a magnet and a coil. In addition, the image stabilizing unit 112 includes a sub-aperture stop unit 121 fixed thereto. During the zooming, the sub-aperture stop unit 121 is moved with the rotation of the cam barrel 110 to change its aperture diameter, thereby maintaining a fully-opened-aperture diameter of the image capturing optical system.

In the linearly movable barrel 113, a first lens unit adjusting ring 124 is held rotatably about the optical axis by eccentric rollers (not illustrated) arranged at three circumferential locations and screws (not illustrated) inserted from a front side (image side) in the optical axis direction. In an inner circumferential surface of the first lens unit adjusting ring 124, a lead cam engaging with the first lens holding frame 101 is formed, which enables position adjustment of the first lens holding frame 101 in the optical axis direction by its rotation about the optical axis. The first lens unit adjusting ring 124 is screw-fixed after the position adjustment of the first lens holding frame 101. This configuration enables correcting shift of focal positions between a wide-angle state and a telephoto state, the shift being caused due to a manufacturing error.

A filter frame 125 is screw-fixed at a front end of the guide barrel 109. The filter frame 125 has a bayonet portion provided at its front end and a screw portion at its inner circumferential portion. Accessories such as a hood and a filter can be mounted to the bayonet portion and the screw portion.

Reference numeral 126 denotes a decorative ring. The decorative ring 126 displays at its front surface a lens name and the like.

The focus lens driving unit 118 is fixed to the guide barrel 109. The focus lens driving unit 118 is constituted by a vibration type motor and a differential mechanism. The focus lens driving unit 118 outputs rotation of a focus key 128 whose rotation amount depends on one of rotation amounts of the vibration type motor and a manual operation ring 127. Instead of the vibration type motor, a stepping motor may be used.

Reference numeral 129 denotes a manual zoom operation ring. The manual zoom operation ring 129 includes a groove portion formed in its inner circumferential portion so as to extend in the circumferential direction and engaging with a fixed roller (not illustrated), and thereby rotation of the manual zoom operation ring 129 about the optical axis is allowed with its movement in the optical axis direction being prevented. In addition, in the inner circumferential portion of the manual zoom operation ring 129, a concave portion is formed with which a zoom key (not illustrated) screw-fixed to the cam barrel 110 engages. The engagement of the zoom key with the concave portion enables integral rotation of the cam barrel 110 and the manual zoom operation ring 129 through the zoom key.

In the outer circumferential portion of the object-side second lens holding frame 102 that holds the object-side subunit L2A, a roller as a cam follower is provided which engages with the cam groove portion formed in the outer circumferential portion of the focus cam barrel 117. Furthermore, in the focus cam barrel 117, an engagement portion engaging with the focus key 128 is formed, which rotates the focus cam barrel 117 about the optical axis integrally with the focus key 128.

Reference numeral 130 denotes a scale sheet that is rotated integrally with the focus key 128 and that displays image capturing distance through the scale window. Reference numeral 131 denotes a main substrate. The main substrate 131 is electrically connected to the focus lens driving unit 118, the electromagnetic aperture stop unit 120, the image stabilizing unit 112, a gyro substrate and an encoder flexible substrate through flexible substrates (not illustrated) or directly and performs various controls thereof.

Reference numeral 132 denotes a contact block screw-fixed to the mount 106. The contact block 132 is electrically connected to the main substrate 131 through a flexible substrate and allows communication and power supply between the main substrate 131 and the camera body. Reference numeral 133 a back lid elastically joined to the mount 106 to cut off undesirable light.

In the interchangeable lens having such a configuration, rotating the manual zoom operation ring 129 rotates the cam barrel 110 through the zoom key and thereby moves all of the first to fourth lens units L1 to L4 in the optical axis direction to perform the zooming. As described above, during the zooming, the second and fourth lens units L2 and L4 are moved integrally with each other.

The driving force from the vibration type motor included in the focus lens driving unit 118 in the autofocus or a user's manual operation of the manual operation ring 127 in the manual focus rotates the focus key 128. This rotation of the focus key 128 moves the subunit L2A in the optical axis direction to perform the autofocus or the manual focus.

In image blur correction (image stabilization), the driver of the image stabilizing unit 112 is controlled depending on output of a vibration gyro mounted on the above-described gyro substrate, and thereby the third lens unit L3 is shifted in the plane orthogonal to the optical axis to correct the image blur.

Figure 5:
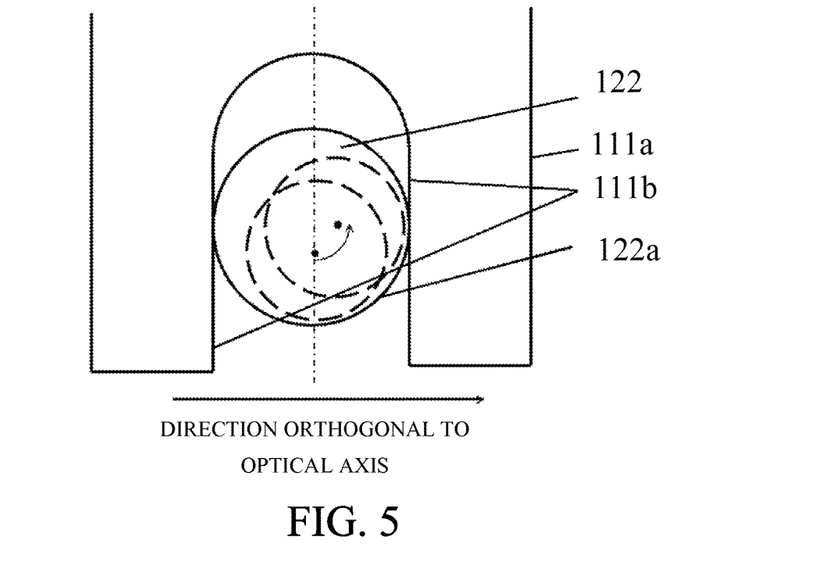
FIG. 5 illustrates a movement of a fourth lens-holding frame in response to rotation of an eccentric roller, in the lens holding structure illustrated in FIG. 1.

Next, with reference to FIG. 5, description will be made in more detail of a method of correcting the optical axis shift in the lens holding structure integrally connecting the second and fourth lens units L2 and L4. In FIG. 5, a left-right direction corresponds to the direction orthogonal to the optical axis.

As illustrated in FIG. 5, with rotation of the eccentric portion 122*a* of the eccentric roller 122 in a counterclockwise direction (indicated by a curved arrow), a center (indicated by a point) of the roller seat 105*b* of the fourth lens holding frame 105 to which the eccentric roller 122 is fixed by the screw 123 is moved as illustrated by dashed circles. As viewed from the lens unit base frame 111 which is a reference, the fourth lens holding frame 105 is moved (rotated) about the eccentric portion 122*a* in a direction indicated by a straight arrow which is orthogonal to the optical axis. In this embodiment, rotation of the eccentric rollers 122 arranged at the three circumferential locations in a same manner enables moving the fourth lens-holding frame 105 in the plane orthogonal to the optical axis to a position where an optical axis of the fourth lens unit L4 coincides with that of the second lens unit L2. That is, this embodiment can correct the optical axis shift of the fourth lens holding frame 105 with respect to the lens unit base frame 111.

As described above, this embodiment has a configuration that enables correcting the optical axis shift in a process of installing the fourth lens holding frame 105 to the lens unit base frame 111. Therefore, this embodiment enables, without decreasing a correction accuracy of the optical axis shift, efficient connection with a small occupied space between the lens unit base frame 111 and the fourth lens holding frame 105 between which optical elements such as the third lens holding frame 104, the image stabilizing unit 112 and the electromagnetic stop unit 120 are arranged. This makes it possible to miniaturize the interchangeable lens 100.

This embodiment enables providing a configuration that the lens unit base frame 111 and the fourth lens holding frame 105 are arranged in a smaller occupied space as compared to that of a conventional configuration, which achieves miniaturization of the interchangeable lens and improves design flexibility thereof. This configuration is effective particularly for a case where the lens unit base frame 111 and the fourth lens holding frame 105 are moved integrally with each other in the optical axis direction and other units and lenses are arranged therebetween. This configuration is effective also for a case where a member such as the main substrate 131 is disposed on the image side further than the fourth lens holding frame 105 and therefore design flexibility is limited.

Although this embodiment has described the interchangeable lens including the four lens units, the above-described configuration is effective also for interchangeable lenses each including five or more lens units. Furthermore, although this embodiment has described the interchangeable lens used for the single-lens reflex camera, alternative embodiments of the present invention include lens barrels of various image capturing apparatuses (optical apparatuses) such as a lens-integrated camera, a digital camera and a video camera.

This embodiment achieves efficient arrangement of the position adjusting mechanism capable of correcting the optical axis shift of the lens holder, of positioning the lens holder in the optical axis direction and of preventing the tilt of the lens holder, which enables miniaturization of the lens apparatus and improvement of design flexibility thereof. Thus, using the lens apparatus for optical apparatuses enables realizing compact optical apparatuses each having a high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-031209, filed on Feb. 21, 2014, which is hereby incorporated by reference wherein in its entirety.

What is claimed is:

1. A lens apparatus comprising:
a first lens holder configured to hold a first lens and including a plurality of first contacting portions and a second contacting portion; and
a base member configured to support the first lens holder and including a plurality of first receiving portions and a second receiving portion,
wherein, the first lens holder and the base member are connected to each other,
each of the first receiving portions is disposed so as to sandwich each of the first contacting portions in a circumferential direction of the first lens,
the second receiving portion is disposed so as to sandwich the second contacting portion in an optical axis direction in which an optical axis of the first lens extends,
the first contacting portions are a plurality of rollers,
at least one of the first contacting portions is an eccentric roller including an eccentric portion eccentric with respect to a rotation center of the eccentric roller for a change of a position of the first lens holder with respect to the base member in a plane orthogonal to the optical axis direction by a rotation of the eccentric roller, the eccentric portion contacting one of the first receiving portions,
the second contacting portion contacts the second receiving portion so as to position the first lens holder with respect to the base member in the optical axis direction and to suppress the first lens holder from tilting with respect to the base member,
the base member includes multiple extending portions extending in the optical axis direction disposed at mutually different positions in the circumferential direction,
the multiple extending portions each include a first receiving portion and the second receiving portion,
each of the first receiving portions is defined by paired wall portions contacting with the each of the first contacting portions and the second receiving portion is defined by a groove portion of each of the multiple extending portions and the second contacting portion is a protrusion engaging with the groove portion,
an end portion of each of the multiple extending portions includes a part which houses one of the first contacting portions and is opened toward a side of the first lens holder, and
the paired wall portions are provided on an inner surface of the part and the groove portion is provided in the part.

2. A lens apparatus according to claim 1, wherein:
the base member includes a second lens holder configured to hold a second lens,
the multiple extending portions extend in the optical axis direction from multiple locations of the second lens holder in the circumferential direction, and
in the optical axis direction, an optical element other than the first and second lenses is disposed between the second lens holder of the base member and the first lens holder.

3. A lens apparatus according to claim 1, wherein the base member and the first lens holder are configured to be moved integrally with each other in the optical axis direction during zooming or focusing.

4. An optical apparatus comprising:
a lens apparatus; and
a body configured to house or hold the lens apparatus,
wherein the lens apparatus comprises:
a first lens holder configured to hold a first lens and including a plurality of first contacting portions and a second contacting portion; and
a base member configured to support the first lens holder and including a plurality of first receiving portions and a second receiving portion,
wherein the first lens holder and the base member are connected to each other,
each of the first receiving portions is disposed so as to sandwich each of the first contacting portions in a circumferential direction of the first lens,
the second receiving portion is disposed so as to sandwich the second contacting portion in an optical axis direction in which an optical axis of the first lens extends,
the first contacting portions are a plurality of rollers,
at least one of the first contacting portions is an eccentric roller including an eccentric portion eccentric with respect to a rotation center of the eccentric roller for a change of a position of the first lens holder with respect to the base member in a plane orthogonal to the optical axis direction by a rotation of the eccentric roller, the eccentric portion contacting one of the first receiving portions,
the second contacting portion contacts the second receiving portion so as to position the first lens holder with respect to the base member in the optical axis direction and to suppress the first lens holder from tilting with respect to the base member,
the base member includes multiple extending portions extending in the optical axis direction disposed at mutually different positions in the circumferential direction,
the multiple extending portions each include a first receiving portion and the second receiving portion,
each of the first receiving portions is defined by paired wall portions contacting with the each of the first contacting portions and the second receiving portion is defined by a groove portion of each of the multiple extending portions and the second contacting portion is a protrusion engaging with the groove portion,
an end portion of the each of the multiple extending portions includes a part which houses one of the first contacting portions and is opened toward a side of the first lens holder, and
the paired wall portions are provided on an inner surface of the part and the groove portion is provided in the part.

5. A lens apparatus according to claim 1, wherein in the first lens holder, the first and second contacting portions are overlapped with each other in a view from the circumferential direction.

6. A lens apparatus according to claim 1, wherein in the base member, the first and second receiving portions are adjacent to each other in the view from the circumferential direction.

* * * * *